(12) United States Patent
Lee

(10) Patent No.: US 6,557,447 B2
(45) Date of Patent: May 6, 2003

(54) BAND SAWING MACHINE HAVING BAND SAW REPLACEABLE RAPIDLY

(76) Inventor: Lien-Chu Lee, No. 50-2, Ta Chou Road, Shen Kang Hsian, Taichung Hsien (TW)

( * ) Notice: Subject to any disclaimer, the term of this patent is extended or adjusted under 35 U.S.C. 154(b) by 42 days.

(21) Appl. No.: 09/945,712

(22) Filed: Sep. 5, 2001

(65) Prior Publication Data

US 2003/0005805 A1 Jan. 9, 2003

(51) Int. Cl.[7] .............................................. B27B 13/03
(52) U.S. Cl. ............................. 83/816; 83/814; 83/816
(58) Field of Search ..................... 83/816, 788, 406.1, 83/380, 835, 200.1, 386

(56) References Cited

U.S. PATENT DOCUMENTS

| | | | | |
|---|---|---|---|---|
| 2,101,343 A | * | 12/1937 | Ponton | 83/818 |
| 2,664,118 A | * | 12/1953 | Krumback | 83/817 |
| 2,963,054 A | * | 12/1960 | Eschenburg | 83/802 |
| 3,733,952 A | * | 5/1973 | Fukagami et al. | 83/789 |
| 5,802,939 A | * | 9/1998 | Wiand et al. | 83/169 |
| 6,073,531 A | * | 6/2000 | Chang | 83/818 |

\* cited by examiner

*Primary Examiner*—Allan N. Shoap
*Assistant Examiner*—Phong Nguyen
(74) *Attorney, Agent, or Firm*—Browdy and Neimark, P.L.L.C.

(57) ABSTRACT

A band sawing machine has a band saw which runs on a drive wheel and a driven wheel of the band sawing machine. The band sawing machine is provided with a slide seat to which the driven wheel is pivoted. The band sawing machine is provided with an eccentric wheel in contact with the slide seat. The eccentric wheel is turned to bring about a change in diametrical distance, thereby resulting in the up-and-down movement of the slide seat. The distance between the drive wheel and the driven wheel is thus shortened to facilitate the replacing of the band saw.

7 Claims, 5 Drawing Sheets

BAND SAWING MACHINE HAVING BAND SAW REPLACEABLE RAPIDLY

FIELD OF THE INVENTION

The present invention relates generally to a band sawing machine, and more particularly to a band sawing machine with a band saw replaceable rapidly.

BACKGROUND OF THE INVENTION

The conventional band saw runs on two rollers. As the band saw is worn out, it is replaced by first shortening the distance between the two rollers so as to facilitate the removing of the worn-out band saw from the two rollers.

The conventional mechanism for shortening the distance between the two rollers comprises a slide seat which is mounted on the top of the band sawing machine stand. A driven wheel is pivoted to the slide seat which is connected with a threaded rod for regulating the elevation of the slide block, thereby resulting in the change in distance between the two rollers.

The conventional mechanism is defective in design in that the driven wheel must be lowered for a considerable distance for replacing the band saw. The control of elevation of the slide block by the threaded rod is inefficient and time-consuming.

SUMMARY OF THE INVENTION

The primary objective of the present invention is to provide a band sawing machine with a band saw which can be replaced with ease and speed.

The present invention comprises a machine stand, a drive wheel mounted at the bottom of the machine stand, a driven wheel mounted on the top of the machine stand, a band saw running on the drive wheel and the driven wheel, a slide seat slidably mounted on the machine stand and provided with a press portion. The driven wheel is pivoted on the slide seat. An eccentric wheel is pivoted on the machine stand such that the eccentric wheel is in contact with the bottom side of the press portion of the slide seat, and that the eccentric wheel is connected with a wrenching member capable of turning the eccentric wheel so as to cause the slide seat to engage in the longitudinal displacement to facilitate the replacing of the band saw.

DETAILED DESCRIPTION OF THE INVENTION

Figure 1:
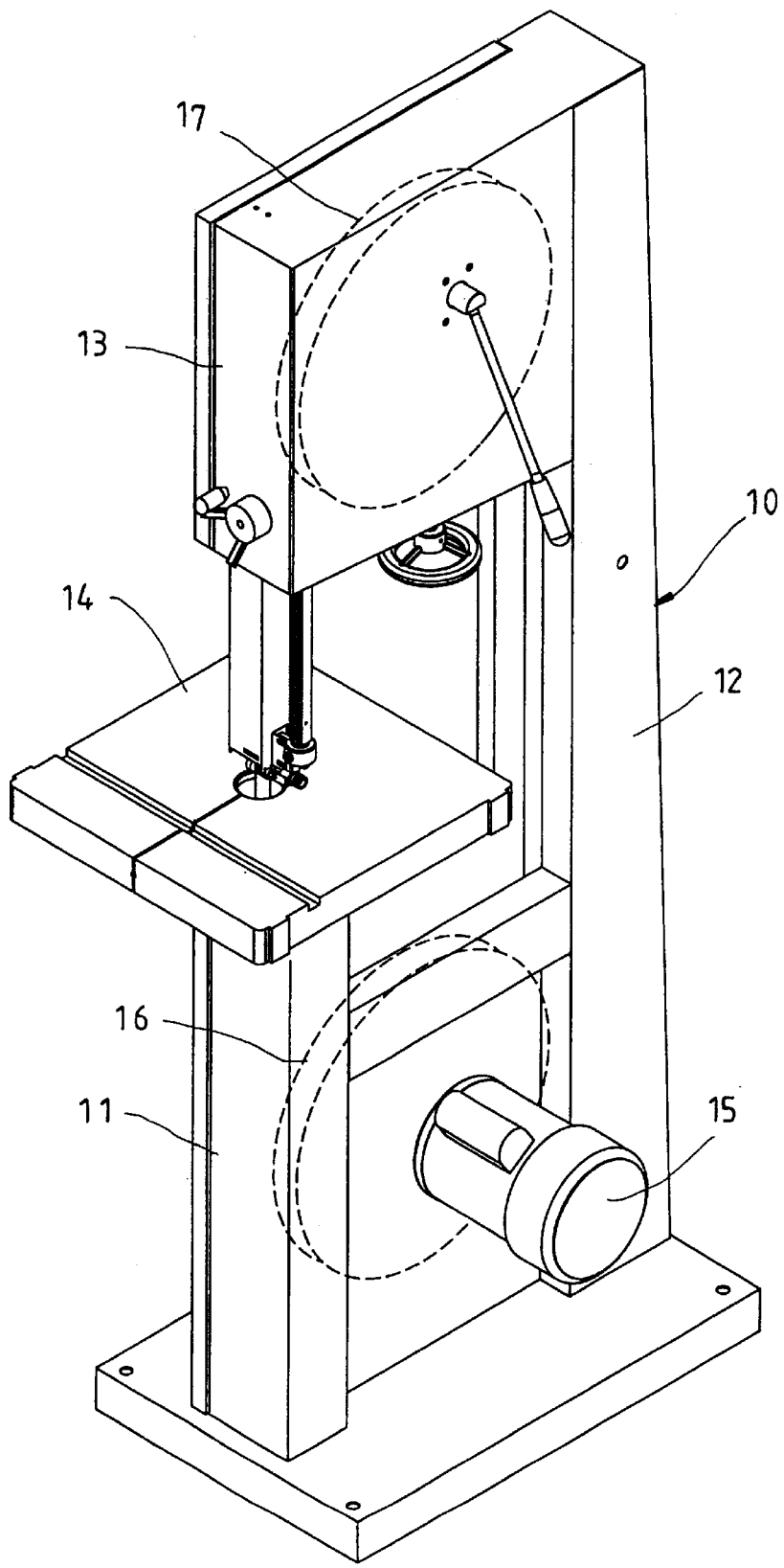
FIG. 1 shows a rear view of a preferred embodiment of the present invention.
Figure 2:
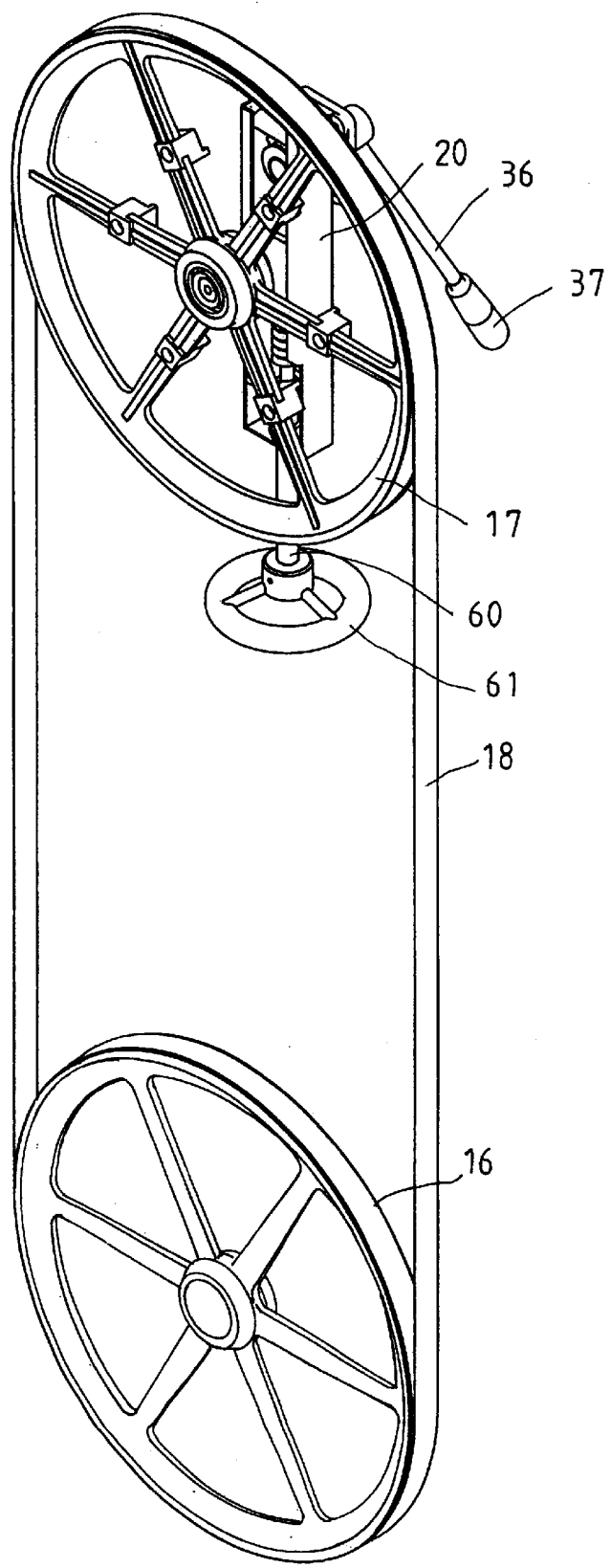
FIG. 2 shows a partial front view of the preferred embodiment of the present invention to show the position relationship between the driven wheel and the slide seat.

As shown in FIGS. 1 and 2, the band sawing machine of the present invention comprises the following components.

A machine stand 10 is formed of a bottom seat 11, a side pillar 12, a top seat 13, and a workbench 14. The bottom seat 11 is provided with a drive motor 15.

A drive wheel 16 is pivoted in the bottom seat 11 of the machine stand 10 and is driven by the drive motor 15.

A driven wheel 17 is mounted in the top seat 13 such that the axial, line of the driven wheel 17 is parallel to the axial line of the drive wheel 16.

A band saw 18 runs on the drive wheel 16 and the driven wheel 17 such that one side of the band saw 18 is longitudinally put through the workbench 14.

Figure 3:
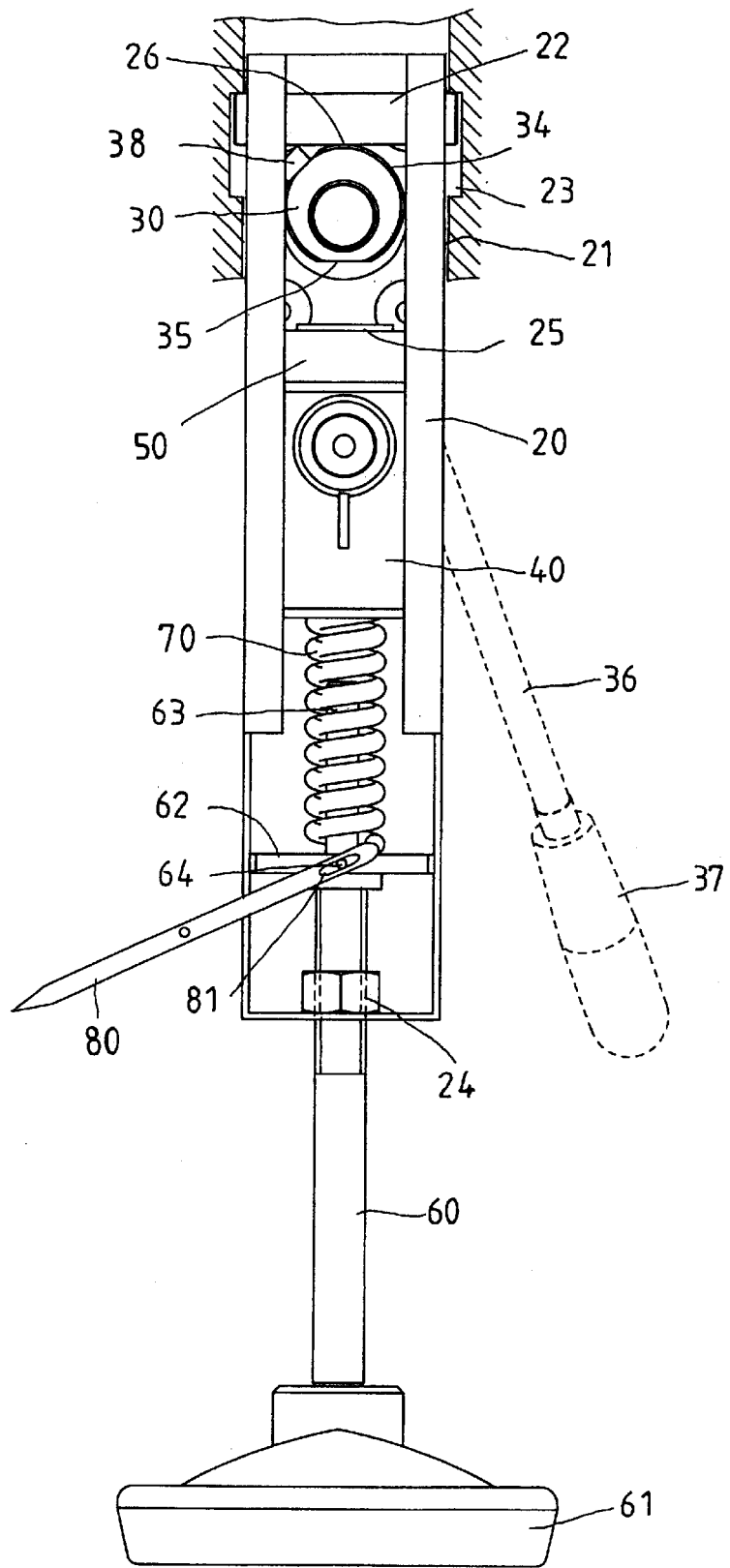
FIG. 3 shows a front view of the slide seat as shown in FIG. 2, with the eccentric wheel being located at the first angle position and with the slide seat being located at the upper stop point.

The above components are the prior art structures. The present invention further comprises the following components, as shown in FIG. 3.

A slide seat 20 has an inverted U-shaped cross section with the opening facing forward and is mounted in a longitudinal receiving slot 21 of the interior of the top seat 13 of the machine stand 10 to slide longitudinally. The slide seat 20 is provided at the top end with a cross rod 22 with its both ends extending into the slot hole 23 of the side wall of the receiving slot 21, thereby preventing the slide seat 20 from slipping out. The slide seat 20 is provided at the bottom end with a longitudinal threaded hole 24. The slide seat 20 is provided at the top end with a press portion 26. The press portion 26 of the present invention is the rod body of the cross rod 22. The slide seat 20 is provided therein with a stop plate 25.

Figure 4:
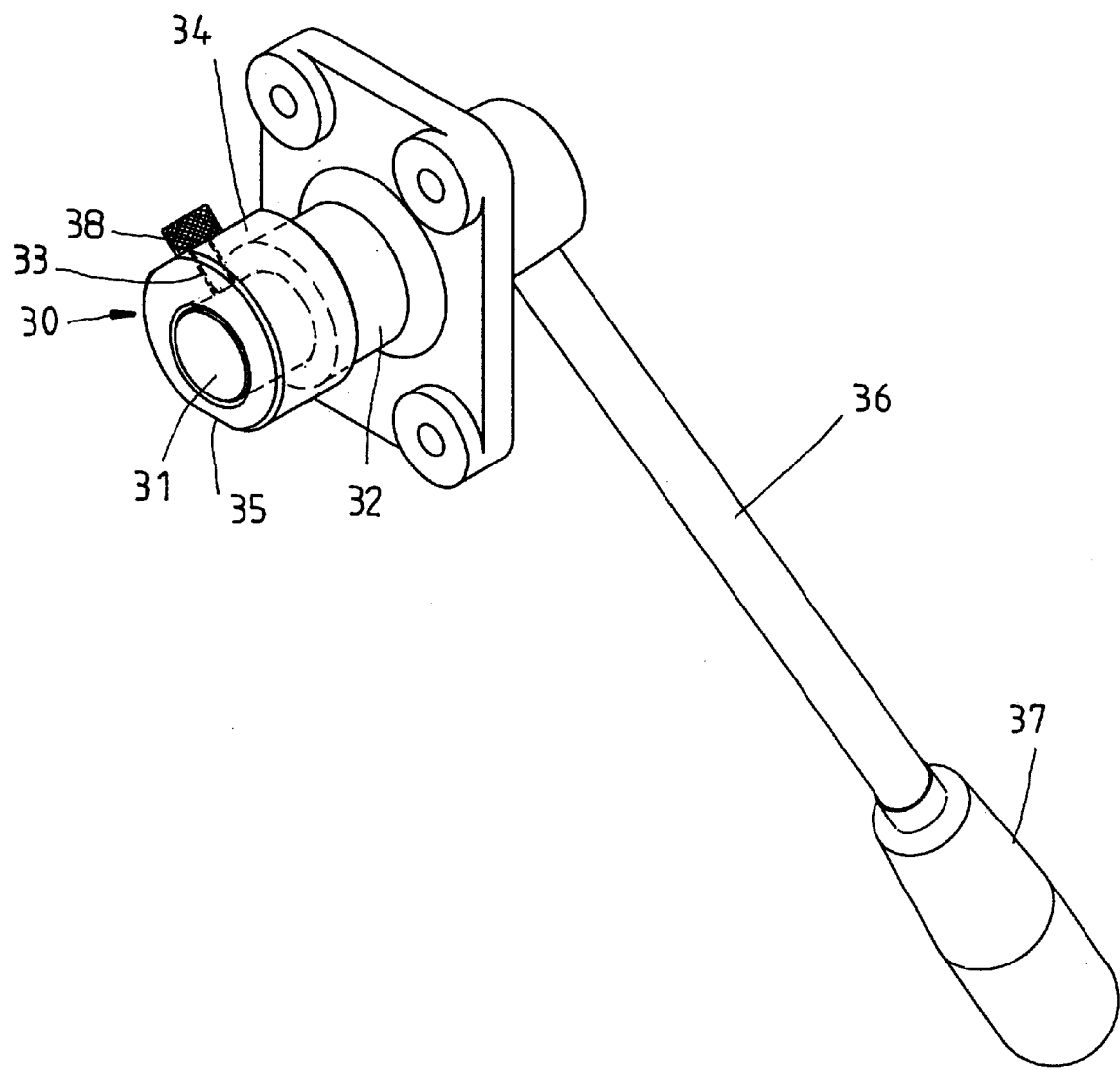
FIG. 4 shows a perspective view of the eccentric wheel and the wrenching member of FIG. 2.
Figure 5:
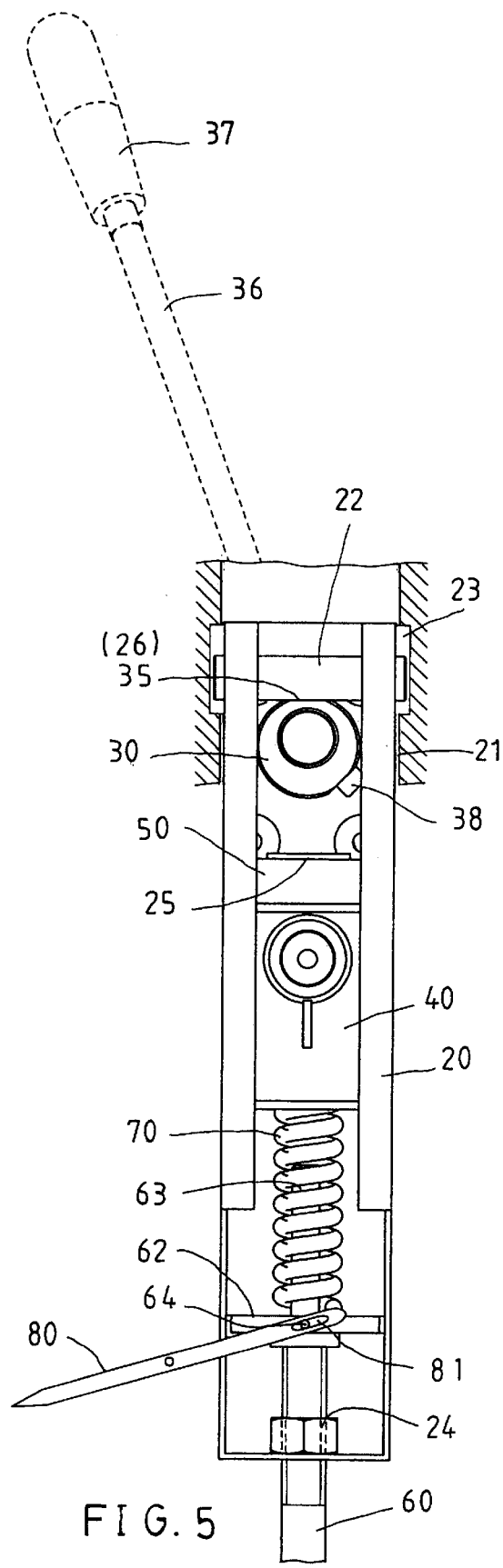
FIG. 5 is similar to FIG. 3, with the eccentric wheel being located at the second angle position, and with the slide seat being located at the lower stop point.

An eccentric wheel 30, as shown in FIG. 4, is pivoted to the interior of the top seat 13 of the machine stand 10 and is provided with an eccentric axial hole 31 for fitting with a pivoting rod 32 of the shell wall of the top seat 13. A bolt 33 is put through from the outer peripheral surface to the pivoting rod 32 for fastening the pivoting rod 32 and the eccentric wheel 30. The eccentric wheel 30 urges upwards the bottom side of the press portion 26 of the slide seat 20 and is provided in the periphery with a long diameter portion 34 separating farther from the axial center, and a short diameter portion 35 separating nearer from the axial center. The eccentric wheel 30 is capable of deflection between a first angle position and a second angle position. As shown in FIG. 3, when it is at the first angle position, the long diameter portion 34 urges upward the press portion 22 of the slide seat 20, so as to push upwards the slide seat 20 to an upper stop point. When the eccentric wheel 30 is at the second angle position, as shown in FIG. 5, the short diameter portion 35 comes in contact with the press portion 26. The slide seat 20 is caused by its own weight to descend to a lower stop point. The short diameter portion 35 of the eccentric wheel 30 is planar to enable the eccentric wheel 30 to press against the press portion 26 securely at the time when the eccentric wheel 30 is at the second angle position. A retaining protrusion 38 comes in contact with the cross rod 22 at the time when the eccentric wheel 30 is at the first angle position, thereby bringing about a locating effect. The bolt 33, which is used to fasten the eccentric wheel 30 and the pivoting rod 32, is provided at the head with said retaining protrusion.

A wrenching member 36 of the present invention is a long rod body, as shown in FIG. 4, which is disposed in the outer portion of the top seat 13 of the machine stand 10 and is connected at one end with the pivoting rod 32, and at other end with a hand grip 37 which is gripped by hand for turning the eccentric wheel 30.

A seat block 40 is disposed in the slide seat 20 and is located under the stop plate 25 to slide up and down in relation to the slide seat 20. The driven wheel 30 is pivoted with the seat block 40.

A first elastic member 50 is a rubber block and is held between the top of the seat block 40 and the stop plate 25 of the slide seat 20.

A microadjustment rod 60 is provided at the longitudinal top end with threads which are put through the longitudinal threaded hole 24 of the lower end of the slide seat 20. The bottom end of the microadjustment rod 60 extends out of the bottom of the top seat 13 and is provided with a wheel-shaped thread motion portion 61 for user to turn to cause the microadjustment rod 60 to displace up and down. The microadjustment rod 60 is provided at the top end with a support portion 62 which is provided at the top with an auxiliary rod 63 extending upwards. The support portion 62 is provided at the front side with a projected point 64.

A second elastic member 70 of the present invention is a spiral spring, which is fitted over the auxiliary rod 63 such that the bottom end of the spring urges the support portion 62, and that the top end of the spring urges the underside of the seat block 40.

A pointer 80 is pivoted at the center with the top seat 13 of the machine stand 10 and is provided at the tail end with a slot hole 81 which is fitted with the projected point 64.

When the grip 37 of the wrenching member 36 faces downwards, as shown in FIG. 3, the eccentric wheel 30 is at the first angle position to support the slide seat 20 at the upper stop point, thereby resulting in a greater distance between the drive wheel 16 and the driven wheel 17. As a result, the band saw 18 runs on the drive wheel 16 and the driven wheel 17 at a predetermined tightness.

As the thread motion portion 61 of the microadjustment rod is turned, the microadjustment rod 60 is moved upwards such that the second elastic member 63 is compressed by the support portion 62 so as to press against the seat block 40 which is stopped by the first elastic member 50, thereby resulting in a minute displacement. The driven wheel 17 is also caused to engage in a minute elevation, so as to adjust the tightness of the band saw 18. As the support portion 62 moves, the pointer 80 is caused to move accordingly to point at a scale (not shown in the drawing).

In replacing the band saw 18, the wrenching member 36 is turned counterclockwise to cause the slide seat 20 to descend to the lower stop point, thereby causing the eccentric wheel 30 to deflect to the second angle position, as shown in FIG. 5. The driven wheel 17 is actuated by the slide seat 20 to displace downwards, thereby resulting in a reduction in distance between the drive wheel 16 and the driven wheel 17. The band saw 18 is replaced with ease and speed. As the wrenching member 36 is turned clockwise to return to its normal position, the band saw 18 is ready for service.

The advantage of the present invention is that the replacement of the band saw 18 is done by turning the wrenching member 36. The band saw 18 is actuated by the eccentric wheel 30 to become loosened. As the band saw 18 is replaced, the wrenching member 36 is turned back to tighten the band saw 18.

What is claimed is:

1. A band sawing machine having an easily-replaceable band saw and comprising:
    a machine stand provided at the bottom with a motor;
    a drive wheel mounted at the bottom of said machine stand and driven by the motor;
    a driven wheel mounted on the top of said machine stand; and
    a band saw running on said drive wheel and said driven wheel;
    a slide seat mounted on the top of said machine stand to slide longitudinally, said slide seat provided in the bottom side with a longitudinal threaded hole and a press portion;
    an eccentric wheel pivoted to the top of said machine stand such that said eccentric wheel is in contact with the bottom side of said press portion of said slide seat, said eccentric wheel provided in the periphery with a long diameter portion separating farther from the axial center and a short diameter portion separating relatively nearer the axial center, said eccentric wheel capable of deflection between a first angle position and a second angle position, said long diameter portion being in contact with said press portion at the time when said eccentric wheel is at the first angle position, said short diameter portion being in contact with said press portion at the time when said eccentric wheel is located at the second angle position;
    a wrenching portion connected with the axial center of said eccentric wheel for turning manually said eccentric wheel;
    a seat block mounted on said slide seat to engage in a minute longitudinal displacement in relation to said slide seat, said driven wheel being pivoted to said seat block;
    a first elastic member disposed at the top side of said seat block such that the bottom end of said first elastic member urges said seat block, and that the top end of said first elastic member urges said slide seat;
    a microadjustment rod provided with threads which are engaged with said longitudinal threaded hole of said slide seat, said microadjustment rod provided at a top end with a support portion and at a bottom end with a thread motion portion, said slide seat being actuated to displace up and down by said microadjustment rod in motion; and
    a second elastic member disposed in the bottom side of said seat block such that the top end of said second elastic member urges said seat block, and that the bottom end of said second elastic member urges said support portion of said microadjustment rod.

2. The band sawing machine as defined in claim 1, wherein said microadjustment rod is provided with a projected point; a pointer pivoted at the center to said machine stand and provided at the tail end with a slot hole for fitting with said projected point, said pointer being forced to deflect by said microadjustment rod in motion.

3. The band sawing machine as defined in claim 1, wherein said short diameter portion of said eccentric wheel is planar and capable of contacting said press portion of said slide seat; wherein said long diameter portion is provided with a retaining protrusion which is retained at the side of said press portion at the time when said eccentric wheel is located at the second angle position.

4. The band sawing machine as defined in claim 1, wherein said first elastic member is a rubber block.

5. The band sawing machine as defined in claim 1, wherein said support portion of said microadjustment rod is of a platelike construction and is provided at the top end with an auxiliary rod; wherein said second elastic member is a spiral spring which is fitted over said auxiliary rod.

6. The band sawing machine as defined in claim 1, wherein said eccentric wheel has an eccentric axial hole for fitting with a pivoting rod of said machine stand, with a bolt penetrating from the outer peripheral surface to said pivoting rod for fastening said eccentric wheel and said pivoting rod.

7. The band sawing machine as defined in claim 6, wherein said wrenching member is a long rod body which is connected at one end with said pivoting rod, and at other end with a hand grip.

* * * * *